(12) United States Patent
Kossi et al.

(10) Patent No.: US 9,184,620 B2
(45) Date of Patent: Nov. 10, 2015

(54) METHOD AND APPARATUS FOR IMPROVED WIRELESS CHARGING EFFICIENCY

(75) Inventors: Jouni Olavi Kossi, Espoo (FI); Jarmo Tapani Arponen, Espoo (FI)

(73) Assignee: Nokia Technologies Oy, Espoo (FI)

( * ) Notice: Subject to any disclaimer, the term of this patent is extended or adjusted under 35 U.S.C. 154(b) by 447 days.

(21) Appl. No.: 13/536,869

(22) Filed: Jun. 28, 2012

(65) Prior Publication Data

US 2014/0002013 A1 Jan. 2, 2014

(51) Int. Cl.
*H02J 7/00* (2006.01)
*H02J 7/02* (2006.01)
*B60L 11/18* (2006.01)

(52) U.S. Cl.
CPC .............. *H02J 7/025* (2013.01); *B60L 11/182* (2013.01); *B60L 11/1829* (2013.01); *B60L 11/1835* (2013.01); *Y02T 10/7005* (2013.01); *Y02T 90/12* (2013.01); *Y02T 90/121* (2013.01); *Y02T 90/122* (2013.01); *Y02T 90/125* (2013.01); *Y02T 90/14* (2013.01)

(58) Field of Classification Search
CPC ... H02J 7/0025; H02J 7/0021; B60L 11/1831; Y02T 10/7005; Y02T 10/70088; Y02T 90/125; Y02T 90/16
USPC .......................................... 320/108, 133, 137
See application file for complete search history.

(56) References Cited

U.S. PATENT DOCUMENTS

| | | |
|---|---|---|
| 2005/0021100 A1 | 1/2005 | Tsukamoto et al. |
| 2007/0182367 A1 | 8/2007 | Partovi |
| 2008/0111518 A1 | 5/2008 | Toya |
| 2009/0146608 A1 | 6/2009 | Lee |
| 2010/0201513 A1 | 8/2010 | Vorenkamp et al. |
| 2013/0099776 A1* | 4/2013 | Wu et al. ........................ 324/133 |
| 2013/0249489 A1* | 9/2013 | Hwang ............................ 320/116 |

FOREIGN PATENT DOCUMENTS

| | | | |
|---|---|---|---|
| DE | 10 2004 039651 A1 | 3/2006 | |
| EP | 2 562 908 A1 * | 3/2012 | ................ H02J 7/02 |

OTHER PUBLICATIONS

International Search Report and Written Opinion for Application No. PCT/FI2013/050711 dated Nov. 5, 2013.

Jaron Achterberg, Elena A. Lomonova, Jeroen De Boeij; *Coil Array Structures Compared for Contactless Battery Charging Platform*; May 2008; pp. 617-622; IEEE Transactions on Magnetics, vol. 44, No. 5.

Neha Chawla, Sabri Tosunoglu; *State of the Art in Inductive Charging for Electronic Appliances and its Future in Transportation*; May 2012; 7 pages; 2012 Florida Conference on Recent Advances in Robotics, Boca Raton, Florida.

* cited by examiner

*Primary Examiner* — Vuthe Siek

(74) *Attorney, Agent, or Firm* — Alston & Bird LLP

(57) ABSTRACT

A method, apparatus and computer program product for wireless charging are provided. An indicator displayed on a wireless device may assist a user in placing the device in a more efficient position on a wireless charger. The indicator may comprise an image, and moving the device such that the image aligns with an image on a wireless charger places the device is in a more efficient charging position. Other types of indicators may be displayed to assist a user in moving a device to a more efficient position on the wireless charger.

21 Claims, 5 Drawing Sheets

METHOD AND APPARATUS FOR IMPROVED WIRELESS CHARGING EFFICIENCY

TECHNOLOGICAL FIELD

An example embodiment of the present invention relates generally to wireless technology, and more particularly, to a method, apparatus and computer program product for charging a device with a wireless charger.

BACKGROUND

With the increasing use of wireless devices and the growing number of wireless devices an individual may depend on, comes a demand for simplified and convenient charging solutions. A wireless charger provides a centralized charging mechanism capable of charging one or more compatible devices at the same time.

A wireless charger may be connected by wire to a power source, but may provide a wireless charge to another device when the device is placed on top of the wireless charger. Multiple devices may rest on the wireless charger and the batteries of the multiple devices may receive a charge simultaneously. Wireless chargers may reduce the risk of shock, as users are not exposed to conductors as they may be while otherwise plugging and unplugging wire connections.

BRIEF SUMMARY

A method, apparatus, and computer program product are therefore provided for improving the efficiency of charging a device on a wireless charger. The positioning of a device(s) on a wireless charger may impact the rate of energy transfer and may therefore impact the time needed for a device battery to charge. Embodiments described herein may lead to more efficient placement of a device on a wireless charger and therefore may reduce power consumption by the wireless charger and/or may decrease charging time.

In one embodiment, a method is provided for receiving indication of a position of a device on a wireless charger, determining a more efficient position for the device on the wireless charger, and causing display of an indicator on the device indicating the more efficient position. According to some embodiments, determining a more efficient position comprises retrieving stored position information.

In some embodiments, the indicator comprises a first image replicating a second image on the wireless charger such that the device is in the more efficient position in an instance in which the first image is aligned with the second image. In other embodiments, the indicator comprises a partial image in an instance in which the device is offset from the more efficient position and a complete image in an instance in which the device is in the more efficient position.

In some embodiments, the method further comprises receiving an image to be used as the indicator. The indicator may indicate that the device is to be rotated, and/or the indicator may indicate that the device is to be moved.

In some embodiments, an apparatus is provided comprising at least one processor and at least one memory including computer program code, with the at least one memory and the computer program code configured to, with the processor, cause the apparatus to at least receive indication of a position of a device on a wireless charger, determine a more efficient position for the device on the wireless charger, and providing indication of the more efficient position. According to some embodiments, determining a more efficient position comprises retrieving stored position information.

In some embodiments, the indicator comprises a first image replicating a second image on the wireless charger such that the device is in the more efficient position in an instance in which the first image is aligned with the second image. In other embodiments, the indicator comprises a partial image in an instance in which the device is offset from the more efficient position and a complete image in an instance in which the device is in the more efficient position.

In some embodiments, the at least one memory and the computer program code are further configured to, with the processor, cause the apparatus to receive an image to be used as the indicator. The indicator may indicate that the device is to be rotated and/or that the device is to be moved.

In some embodiments, a computer program product is provided, comprising at least one non-transitory computer-readable storage medium having computer-executable program code instructions stored therein, with the computer-executable program code instructions comprising program code instructions to receive indication of a position of a device on a wireless charger, determine a more efficient position for the device on the wireless charger, and provide indication of the more efficient position. In some embodiments, determining a more efficient position comprises retrieving stored position information.

In some embodiments, the indicator comprises a first image replicating a second image on the wireless charger such that the device is in the more efficient position in an instance in which the first image is aligned with the second image. In other embodiments, the indicator comprises a partial image in an instance in which the device is offset from the more efficient position and a complete image in an instance in which the device is in the more efficient position.

In some embodiments, the computer-executable program code instructions further comprise program code instructions to receive an image to be used as the indicator. The indicator may indicate that the device is to be rotated and/or moved.

In some embodiments, an apparatus is provided, with means for receiving indication of a position of a device on a wireless charger, determining a more efficient position for the device on the wireless charger, and causing display of an indicator on the device indicating the more efficient position. In some embodiments the indicator may be an audio, a visual, a tactile indicator or a combination of such.

BRIEF DESCRIPTION OF THE DRAWINGS

Figure 1:
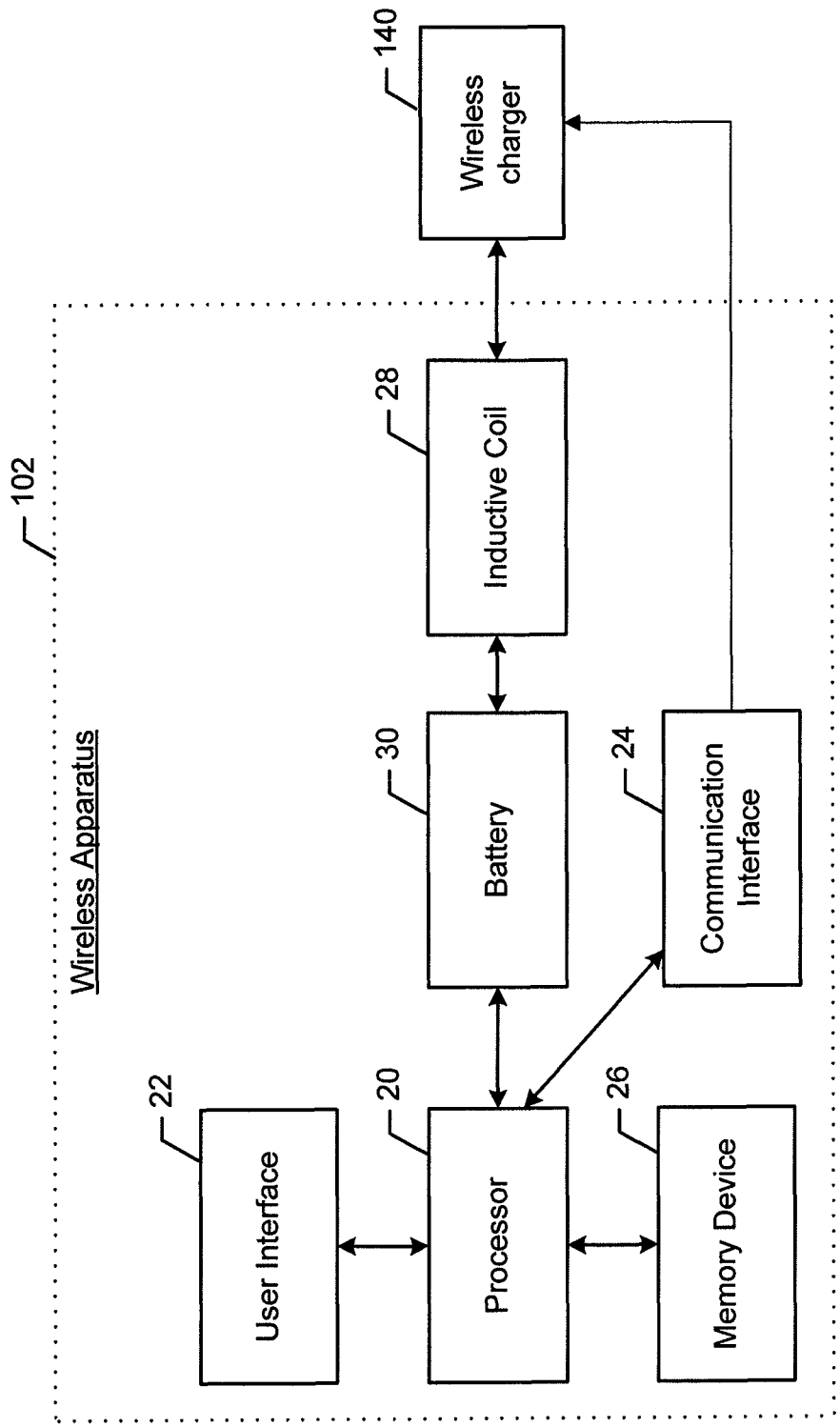
Figure 2:
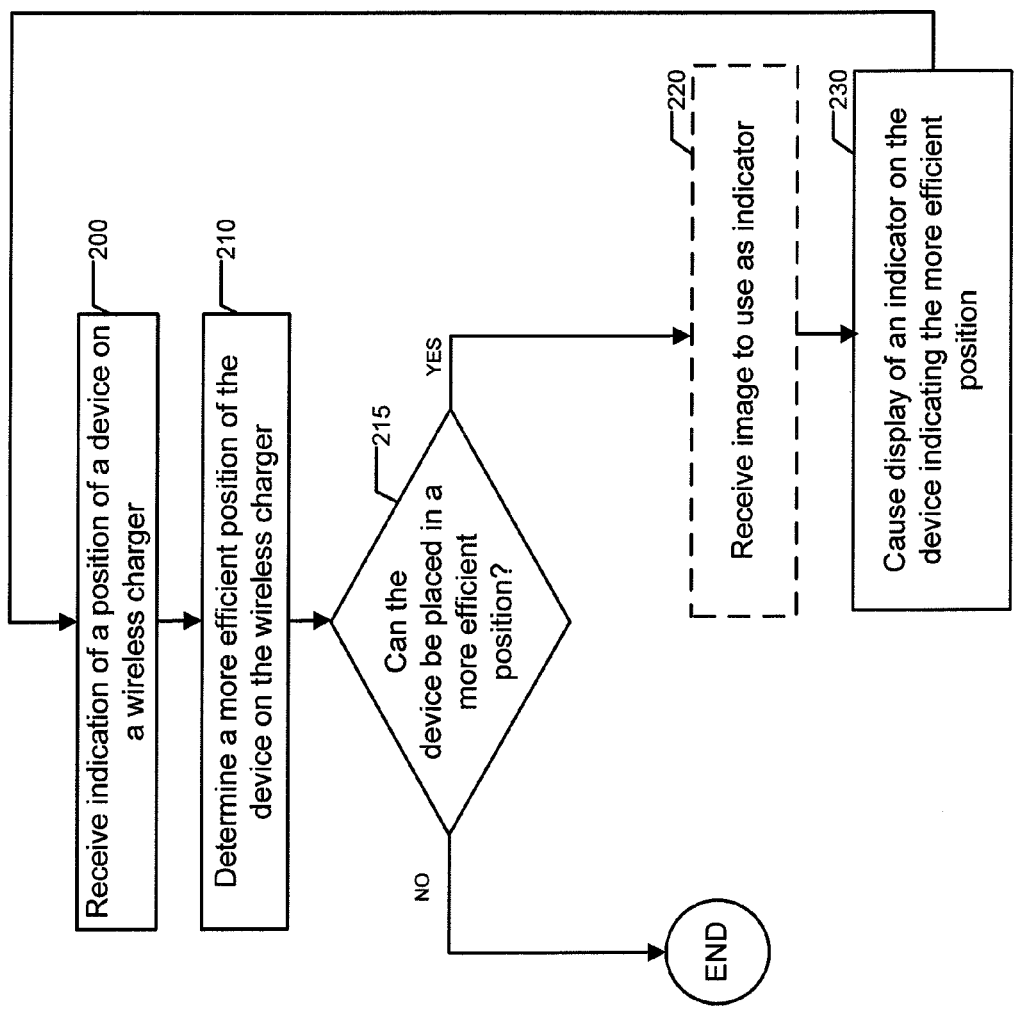
Figure 3A:
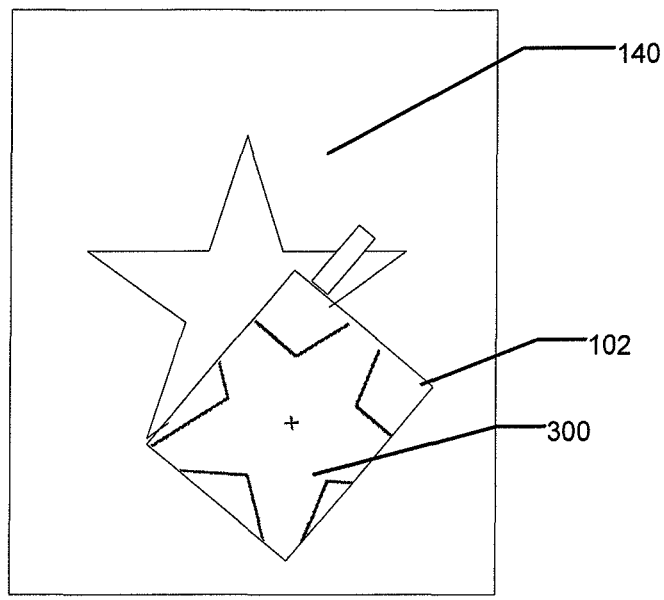
Figure 3B:
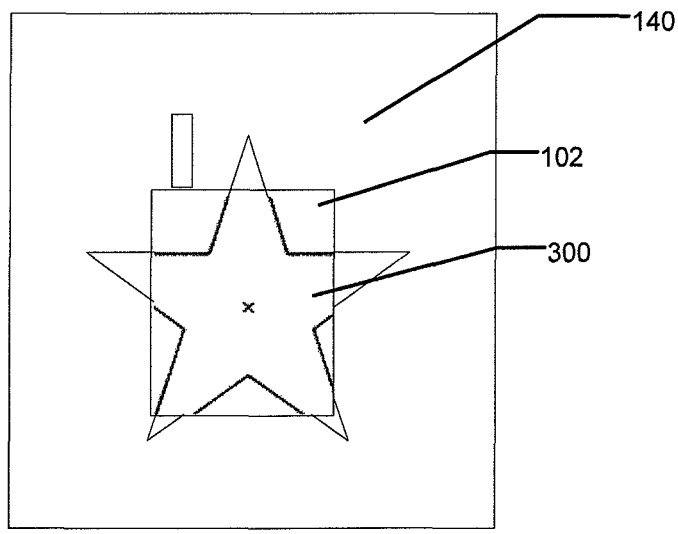
Figure 4A:
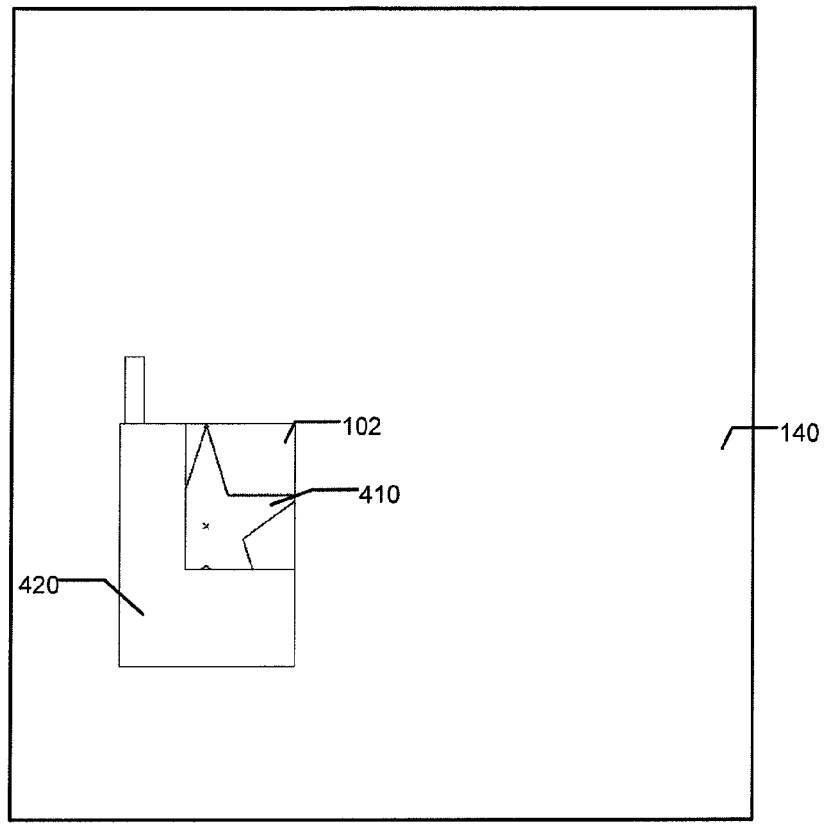
Figure 4B:
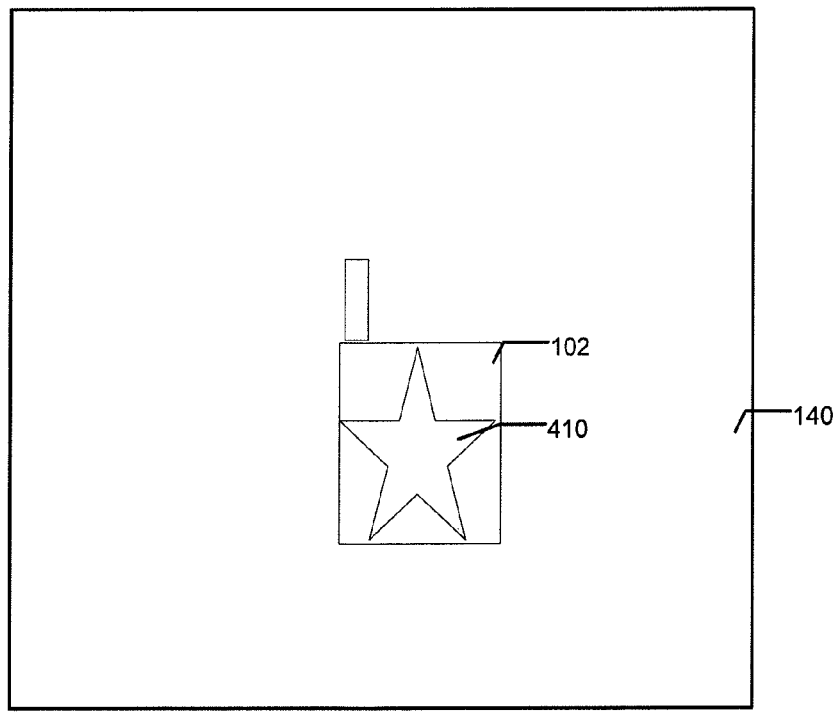
Figure 5:
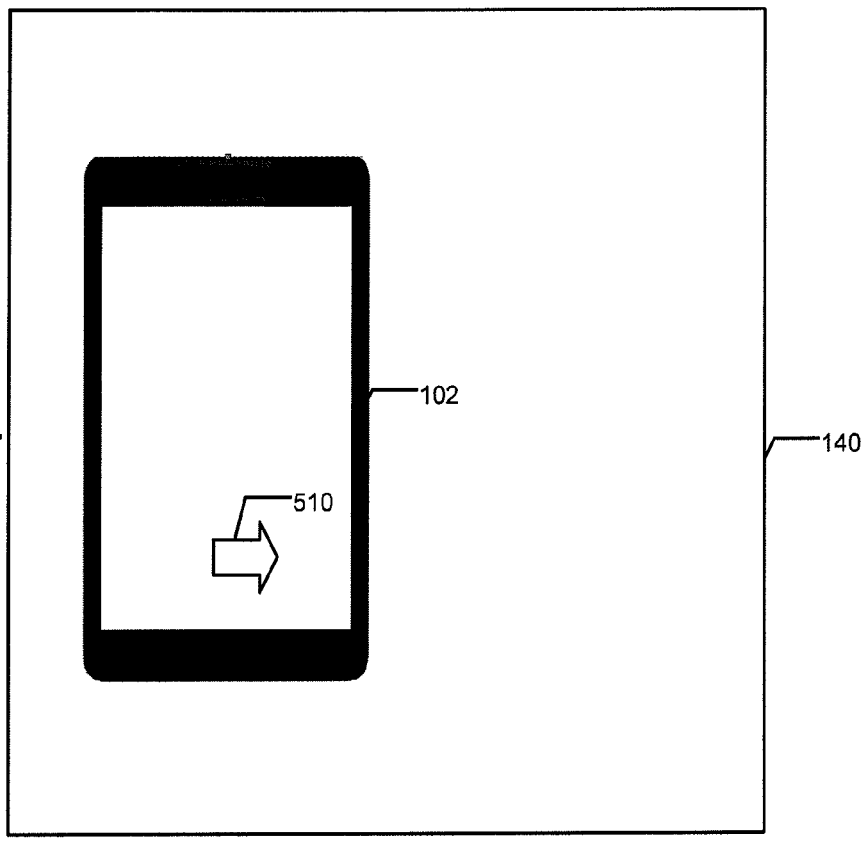
Figure 6:
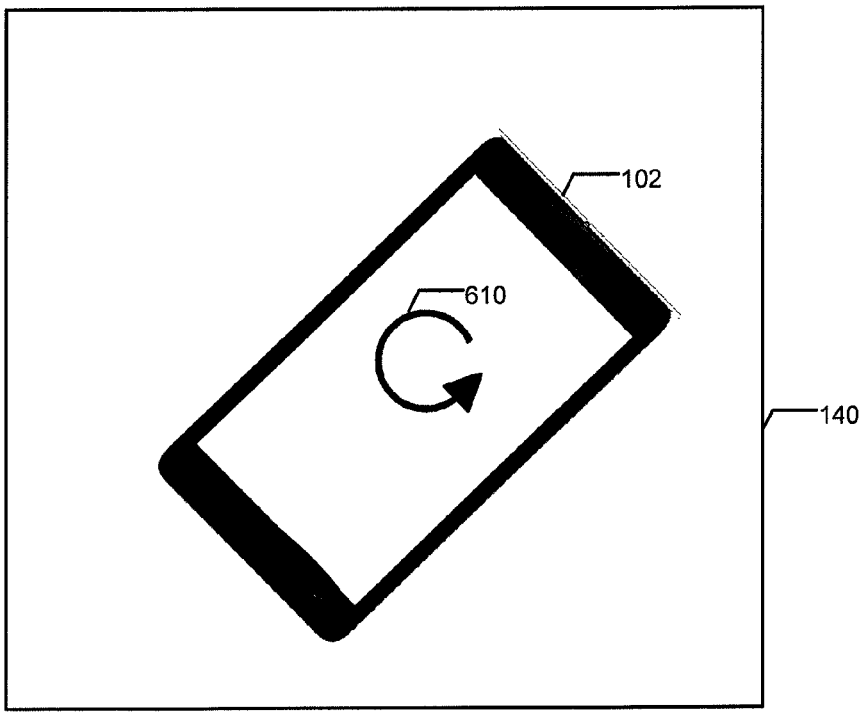

Having thus described certain example embodiments of the present invention in general terms, reference will hereinafter be made to the accompanying drawings which are not necessarily drawn to scale, and wherein:

FIG. 1 is a block diagram of a wireless apparatus, wireless charger, and network, in accordance with some example embodiments of the present invention;

FIG. 2 is a flowchart illustrating operations to indicate a more efficient position for a device on a wireless charger in accordance with an example embodiment;

FIG. 3A illustrates a wireless charger and wireless device displaying an indicator indicating a more efficient position for the device on the wireless charger in accordance with an example embodiment;

FIG. 3B illustrates the wireless apparatus of FIG. 3A in the more efficient position;

FIG. 4A illustrates a wireless charger and wireless device displaying an indicator indicating a more efficient position for the device on the wireless charger in accordance with an example embodiment;

FIG. 4B illustrates the wireless apparatus of FIG. 4A in the more efficient position;

FIG. 5 illustrates a wireless apparatus displaying an indicator indicating movement to a more efficient position; and FIG. 6 illustrates a wireless apparatus displaying an indicator indicating rotation to a more efficient position.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a physical storage medium (e.g., volatile or non-volatile memory device), may be differentiated from a "computer-readable transmission medium," which refers to an electromagnetic signal.

Referring now to FIG. 1, wireless apparatus 102 may include a processor 20, memory device 26, user interface 22, communication interface 24, battery 30, and/or any number of induction coils 28. Wireless apparatus 102 may be embodied by a wide variety of battery powered devices including mobile terminals, such as personal digital assistants (PDAs), pagers, mobile televisions, mobile telephones, gaming devices, laptop computers, tablet computers, cameras, camera phones, video recorders, audio/video players, radios, global positioning system (GPS) devices, navigation devices, or any combination of the aforementioned, and other types of voice and text communications systems.

In some embodiments, the processor 20 (and/or co-processors or any other processing circuitry assisting or otherwise associated with the processor 20) may be in communication with the memory device 26 via a bus for passing information among components of the wireless apparatus 102. The memory device 26 may include, for example, one or more volatile and/or non-volatile memories. In other words, for example, the memory device 26 may be an electronic storage device (e.g., a computer readable storage medium) comprising gates configured to store data (e.g., bits) that may be retrievable by a machine (e.g., a computing device like the processor 20). The memory device 26 may be configured to store information, data, content, applications, instructions, or the like for enabling the apparatus to carry out various functions in accordance with an example embodiment of the present invention. For example, the memory device 26 could be configured to buffer input data for processing by the processor 20. Additionally or alternatively, the memory device 26 could be configured to store instructions for execution by the processor 20.

The wireless apparatus 102 may, in some embodiments, be embodied in various devices as described above. However, in some embodiments, the wireless apparatus 102 may be embodied as a chip or chip set. In other words, the wireless apparatus 102 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The wireless apparatus 102 may therefore, in some cases, be configured to implement an embodiment of the present invention on a single chip or as a single "system on a chip." As such, in some cases, a chip or chipset may constitute means for performing one or more operations for providing the functionalities described herein.

The processor 20 may be embodied in a number of different ways. For example, the processor 20 may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor 20 may include one or more processing cores configured to perform independently. A multi-core processor may enable multiprocessing within a single physical package. Additionally or alternatively, the processor 20 may include one or more processors configured in tandem via the bus to enable independent execution of instructions, pipelining and/or multithreading.

In an example embodiment, the processor 20 may be configured to execute instructions stored in the memory device 26 or otherwise accessible to the processor 20. Alternatively or additionally, the processor 20 may be configured to execute hard coded functionality. As such, whether configured by hardware or software methods, or by a combination thereof, the processor 20 may represent an entity (e.g., physically embodied in circuitry) capable of performing operations according to an embodiment of the present invention while configured accordingly. Thus, for example, when the processor 20 is embodied as an ASIC, FPGA or the like, the processor 20 may be specifically configured hardware for conducting the operations described herein. Alternatively, as another example, when the processor 20 is embodied as an executor of software instructions, the instructions may specifically configure the processor 20 to perform the algorithms and/or operations described herein when the instructions are executed. However, in some cases, the processor 20 may be a processor of a specific device (e.g., a mobile terminal or network entity) configured to employ an embodiment of the present invention by further configuration of the processor 20 by instructions for performing the algorithms and/or operations described herein. The processor 20 may include, among other things, a clock, an arithmetic logic unit (ALU) and logic gates configured to support operation of the processor 20.

Meanwhile, the communication interface 24 may be any means such as a device or circuitry embodied in either hardware or a combination of hardware and software that is configured to receive and/or transmit data from/to a network and/or any other device or module in communication with the wireless apparatus 102. In this regard, the communication interface 24 may include, for example, an antenna (or multiple antennas) and supporting hardware and/or software for enabling communications with a wireless communication network. Additionally or alternatively, the communication interface 24 may include the circuitry for interacting with the antenna(s) to cause transmission of signals via the antenna(s) or to handle receipt of signals received via the antenna(s). In some environments, the communication interface 24 may alternatively or also support wired communication. As such, for example, the communication interface 24 may include a communication modem and/or other hardware/software for supporting communication via cable, digital subscriber line (DSL), universal serial bus (USB) or other mechanisms.

According to some embodiments, communication interface 24 may be configured to communicate with wireless charger 140, either directly or over a network. Additionally or alternatively, wireless apparatus 102 may communicate with wireless charger 140 via radio frequency signal provided by induction coil(s) 28. In some embodiments, near field magnetic resonance may be used to transmit power between wireless charger 140 and a wireless apparatus 102. It will be appreciated that in some embodiments, wireless charger 140 may be a wireless device, configured to charge other wireless devices with from its power supply.

In some embodiments, such as instances in which the wireless apparatus 102 is embodied by a user device, the wireless apparatus 102 may include a user interface 22 that may, in turn, be in communication with the processor 20 to receive an indication of a user input and/or to cause provision of an audible, visual, mechanical or other output to the user. As such, the user interface 22 may include, for example, a keyboard, a mouse, a joystick, a display, a touch screen(s), touch areas, soft keys, a microphone, a speaker, or other input/output mechanisms. Alternatively or additionally, the processor 20 may comprise user interface circuitry configured to control at least some functions of one or more user interface elements such as, for example, a speaker, ringer, microphone, display, and/or the like. The processor 20 and/or user interface circuitry comprising the processor 20 may be configured to control one or more functions of one or more user interface elements through computer program instructions (e.g., software and/or firmware) stored on a memory accessible to the processor 20 (e.g., memory device 26, and/or the like).

In some embodiments, wireless apparatus 102 may comprise a battery 30, configured to store, and in turn, provide power to various components of wireless apparatus 102. Battery 30 may be coupled to inductive coil(s) 28 in order to receive a charge. The inductive coil(s) 28 may be configured to be operable to provide power to charge the battery. In this regard, when a wireless apparatus 102 is placed on or adjacent to a wireless charger 140, such that inductive coil(s) 28 is in close proximity to an inductive coil of the wireless charger 140 such that the inductive coil(s) 28 is in the electromagnetic field of the inductive coil of the wireless charger, the two coils may form an electrical transformer. Placing wireless apparatus 102 on a wireless charger 140 in different positions may impact the strength of the electromagnetic field between the coils and therefore may affect the rate at which battery 30 charges.

Therefore, the operations of FIG. 2 are provided and may assist a user in placing a wireless apparatus 102 on a wireless charger 140 in a position that allows for efficient charging. At operation 200, wireless apparatus 102 may receive indication of its position on or near wireless charger 140. The indication may comprise any type of position information indicating proximity of any number of inductive coils in the wireless apparatus 102 to any number of inductive coils in wireless charger 140. The position information may define the relative position of the wireless apparatus 102 upon the wireless charger 140, such as by use of x, y coordinates defining one position, and/or a reference location of the wireless apparatus, such as, for example, a predefined corner of the wireless apparatus 102. The position information of this embodiment may also define the angle, if any, between the wireless apparatus 102 and wireless charger 140. The wireless apparatus 102 may receive position information from wireless charger 140, such as via communication interface 24 and/or induction coil(s) 28, for example. Additionally or alternatively, wireless apparatus 102 may utilize position information, such as location of induction coil(s) 28, that may be stored on wireless apparatus 102, such as on memory device 26. Stored position information may indicate positioning of inductive coil(s) 28 relative to wireless apparatus 102 as a whole, and/or positioning of inductive coils in wireless charger 104, as determined and saved in previous charging sessions, for example.

Continuing to operation 210, wireless apparatus 102 may determine a more efficient position for wireless apparatus 102 to charge on the wireless charger 140. Processor 20, for example, may utilize position information to determine a position of wireless apparatus 102 on wireless charger 140 in which battery 30 may receive a charge more efficiently, or at a faster rate. As such, the more efficient position may place induction coil(s) in closer proximity to induction coils of the wireless charger 140. In some embodiments, wireless apparatus 102 may determine that it is not receiving an optimal charge rate potentially produced by wireless charger 140. In such a scenario, wireless apparatus 102 may determine that a more optimal placement may be achieved.

The wireless apparatus 102 may determine the more efficient position in various manners. In one method, such as one in which a learning phase has already been performed, the wireless apparatus 102 may have a predefined position stored, for example, in memory device 26, that defines the more efficient position. The wireless apparatus 102, such as by processor 20, may compare the position information to predefined position information and determine the difference there between with the difference representing the change in position of the wireless apparatus needed to place the wireless apparatus in a more efficient position on the wireless charger.

As illustrated by operation 215, in instances in which processor 20, and/or another component of wireless apparatus 102 cannot determine a more efficient position for the wireless apparatus 102 to charge, the process illustrated by FIG. 2 may end. If a more efficient position can be identified, wireless apparatus 102 may receive an image from wireless charger 140 to use as an indicator to assist a user in moving the wireless apparatus 102 into the more efficient position. Additionally or alternatively, an image may be stored in wireless apparatus 102, such as in memory device 26, or an image may not be needed in order to communicate the more efficient position. For example, the wireless apparatus 102 may store one or more images. The stored images may relate to one or more wireless chargers 140. In an example embodiment the wireless charger 140 may provide, or the wireless apparatus 102 may detect, a type and/or identification of the wireless charger 140 and the image(s) to be used as an indicator may be selected based on the identification.

Continuing to operation 230, wireless apparatus 102 may cause display of an indicator on wireless apparatus 102, indicating the more efficient position. In this regard, an indicator may comprise any information or image that may assist a user in moving the wireless apparatus 102 to the more efficient position. According to some embodiments, other types of indication may be provided by wireless apparatus 102, such as beeping sounds that increase or decrease in frequency to indicate proximity from the current position of the wireless apparatus 102 to the more efficient position. In some embodiments, a haptic indication such as vibrating may be used to indicate proximity to the more efficient position.

Any operations of FIG. 2 may be repeated. Repeating some or all of the operation may aide a user in moving wireless apparatus 102 until wireless apparatus 102 can no longer determine a more efficient position. In some embodiments, the wireless apparatus 102 or wireless charger 140 may cause the wireless device 102 to move to the more efficient position without the assistance of a user.

It will be appreciated that the operations of FIG. 2 may be performed as a learning phase, such as in an instance where a wireless apparatus 102 is placed on a wireless charger 140 for the first time, and the information indicating the more efficient position information may be stored in memory for future reference. During a learning phase, an image to be used as an indicator may be transmitted. In some embodiments, the more efficient position information may be calculated or recalculated each time wireless apparatus 102 is placed on wireless charger 140.

FIGS. 3A, 3B, 4A, 4B, 5, and 6 illustrate indicators in accordance with some example embodiments. FIG. 3A illustrates a wireless apparatus 102 on a wireless charger 140. Indicator 300 displayed on wireless apparatus 102 may comprise a first image replicating a second image on wireless charger 140. For example, wireless charger 140 may be a charging mat having the second imprinted or otherwise display thereon. The first image may be determined by the processor 20 of the wireless apparatus 102 based on the position information and the second image, such that the first image is misaligned relative to the second image. The first image may be determined from an analysis of the position information, such as based on a comparison of the position information to a predefined position. Indicator 300 may indicate to a user that moving wireless apparatus 102 such that the first image aligns with the second image may place wireless apparatus 102 in a more efficient position for charging. The first image may be stored on memory device 26, and/or received from wireless charger 140 via inductive coil 28 and/or communication interface 24.

FIG. 3B illustrates wireless apparatus 102 on wireless charger 140 in the more efficient position relative to that shown in FIG. 3A. The first image aligns with the second image to form a complete image and may indicate to a user that wireless device 102 is in the more efficient position for charging.

FIG. 4A illustrates another indicator according to some example embodiments. The image of indicator 410 comprises a partial image. The space in area 420 may help illustrate to a user that indicator 410 is a partial image and the wireless apparatus 102 is offset from the more efficient position. For example, the partial image may be determined by the processor 20 of the wireless apparatus 102 based on the position information. The partial image may be determined from an analysis of the position information, such as based on a comparison of the position information to a predefined position. According to this example embodiment, the image of indicator 410 of wireless apparatus 102 may at least partially replicate an image of wireless charger 140, or as illustrated in FIG. 4, wireless charger 102 may not display and/or comprise an image. Any image retrieved from, for example, memory device 26, and/or received via communication interface 24 and/or induction coil 28, may be used as an indicator. In some embodiments, other radio technologies, such as Bluetooth®, may be used to transmit an indicator to a device.

FIG. 4B illustrates wireless apparatus 102 in the more efficient position relative to that shown in FIG. 4A. Indicator 410 has changed from FIG. 4A to show a complete image, indicating that wireless apparatus 102 is in the more efficient position. Note that the space of area 420 is no longer present in FIG. 4B.

FIG. 5 illustrates an indicator 510 according to some example embodiments. In this scenario, indicator 510 is an arrow indicating to a user to move wireless apparatus 102 to the right to place it in a more efficient position for charging. FIG. 6 illustrates an indicator 610 according to some example embodiments. In this scenario, indicator 610 is an arrow indicating to rotate wireless apparatus 102 counter-clockwise to place it in a more efficient position for charging. An arrow may be used to indicate to move and/or rotate a device in any direction, and/or any other type of indicator to show a user to move and/or rotate a device to a more efficient position may be used.

As described above, FIG. 2 illustrates a flowchart of a wireless apparatus 102, method, and computer program product according to example embodiments of the invention. It will be understood that each block of the flowchart, and combinations of blocks in the flowchart, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by a memory device 26 of a wireless apparatus 102 employing an embodiment of the present invention and executed by a processor 20 of the wireless apparatus 102. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowchart support combinations of means for performing the specified functions and combinations of operations for performing the specified functions for performing the specified functions. It will also be understood that one or more blocks of the flowchart, and combinations of blocks in the flowchart, may be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method comprising:
receiving an indication of a first position of a device on a wireless charger;
while the device is in the first position, determining, by a processor, a more efficient position of the device on the wireless charger for charging the device on the wireless charger relative to the first position; and
while the device is in the first position, providing an indicator of the more efficient position.

2. A method according to claim 1, wherein the indicator of the more efficient position comprises a first image provided on the device replicating a second image on the wireless charger such that the device is in the more efficient position in an instance in which the first image is aligned with the second image.

3. A method according to claim 1, wherein the indicator of the more efficient position comprises a partial image in an instance in which the device is offset from the more efficient position and a complete image in an instance in which the device is in the more efficient position.

4. A method according to claim 1, further comprising:
receiving an image to be used as the indicator of the more efficient position.

5. A method according to claim 1, wherein the indicator of the more efficient position indicates rotating the device.

6. A method according to claim 1, wherein the indicator of the more efficient position indicates moving the device.

7. A method according to claim 1, wherein determining a more efficient position comprises retrieving stored position information.

8. An apparatus comprising at least one processor and at least one memory including computer program code, the at least one memory and the computer program code configured to, with the processor, cause the apparatus to at least:
receive an indication of a first position of a device on a wireless charger;
while the device is in the first position, determine a more efficient position of the device on the wireless charger for charging the device on the wireless charger relative to the first position; and
while the device is in the first position, provide an indicator of the more efficient position.

9. An apparatus according to claim 8, wherein the indicator of the more efficient position comprises a first image provided on the device replicating a second image on the wireless charger such that the device is in the more efficient position in an instance in which the first image is aligned with the second image.

10. An apparatus according to claim 8, wherein the indicator of the more efficient position comprises a partial image in an instance in which the device is offset from the more efficient position and a complete image in an instance in which the device is in the more efficient position.

11. An apparatus according to claim 8, wherein the at least one memory and the computer program code are further configured to, with the processor, cause the apparatus to:
receive an image to be used as the indicator of the more efficient position.

12. An apparatus according to claim 8, wherein the indicator of the more efficient position indicates rotating the device.

13. An apparatus according to claim 8, wherein the indicator of the more efficient position indicates moving the device.

14. An apparatus according to claim 8, wherein determining a more efficient position comprises retrieving stored position information.

15. A computer program product comprising at least one non-transitory computer-readable storage medium having computer-executable program code instructions stored therein, the computer-executable program code instructions comprising program code instructions to:
receive an indication of a first position of a device on a wireless charger;
while the device is in the first position, determine a more efficient position of the device on the wireless charger for charging the device on the wireless charger relative to the first position; and
while the device is in the first position, provide an indicator of the more efficient position.

16. A computer program product according to claim 15, wherein the indicator of the more efficient position comprises a first image provided on the device replicating a second image on the wireless charger such that the device is in the more efficient position in an instance in which the first image is aligned with the second image.

17. A computer program product according to claim 15, wherein the indicator of the more efficient position comprises a partial image in an instance in which the device is offset from the more efficient position and a complete image in an instance in which the device is in the more efficient position.

18. A computer program product according to claim 15, wherein the computer-executable program code instructions further comprise program code instructions to:
receive an image to be used as the indicator of the more efficient position.

19. A computer program product according to claim 15, wherein the indicator of the more efficient position indicates rotating the device.

20. A computer program product according to claim 15, wherein the indicator of the more efficient position indicates moving the device.

21. A computer program product according to claim 15, wherein determining a more efficient position comprises retrieving stored position information.

\* \* \* \* \*